United States Patent [19]
Jonelis et al.

[11] 3,938,411
[45] Feb. 17, 1976

[54] PIPE AND TUBE END PREPARATION APPARATUS

[75] Inventors: Robert E. Jonelis, Barrington; Dieter Christoph, Streamwood; Siegfried Schulz, Rolling Meadows, all of Ill.

[73] Assignee: Midwest Power Corporation, Palatine, Ill.

[22] Filed: Dec. 30, 1974

[21] Appl. No.: 537,077

[52] U.S. Cl. .................................................. 82/4 C
[51] Int. Cl.² ......................................... B23B 3/22
[58] Field of Search ...................... 82/4 C, 45, 33 R

[56] References Cited
UNITED STATES PATENTS

| | | | |
|---|---|---|---|
| 1,168,060 | 1/1916 | Deppeler | 82/4 C |
| 2,358,608 | 9/1944 | Turner | 82/33 R |
| 2,559,950 | 7/1951 | Davis | 82/45 |
| 2,889,721 | 6/1959 | Coleman | 82/4 C |

FOREIGN PATENTS OR APPLICATIONS

| | | | |
|---|---|---|---|
| 890,815 | 3/1962 | United Kingdom | 82/4 C |

*Primary Examiner*—Harrison L. Hinson
*Attorney, Agent, or Firm*—Anthony S. Zummer

[57] ABSTRACT

A pipe and tube end preparation apparatus for simultaneously cutting an inside and an outside chamfer on a tube end is herein disclosed. The apparatus generally includes a tube holder and a housing connected to the tube holder. A head carriage mechanism is connected to the housing. The head carriage mechanism is progressively axially movable with respect to the tube holder and the housing. A drive train is rotatably supported by the head carriage mechanism. A cutter head assembly is fixed to the drive train. The cutter head assembly includes an inside chamfer cutter and an opposed outside chamfer cutter, which acts as a cutting guide for the inside chamfer cutter. A tube end, which is to be prepared, is secured by the tube holder. The drive train rotates the cutter head assembly with respect to the tube end. The head carriage mechanism advances the rotating cutter head assembly into cutting engagement with the tube end, thus simultaneously forming an inside chamfer and an outside chamfer on the tube end.

7 Claims, 5 Drawing Figures

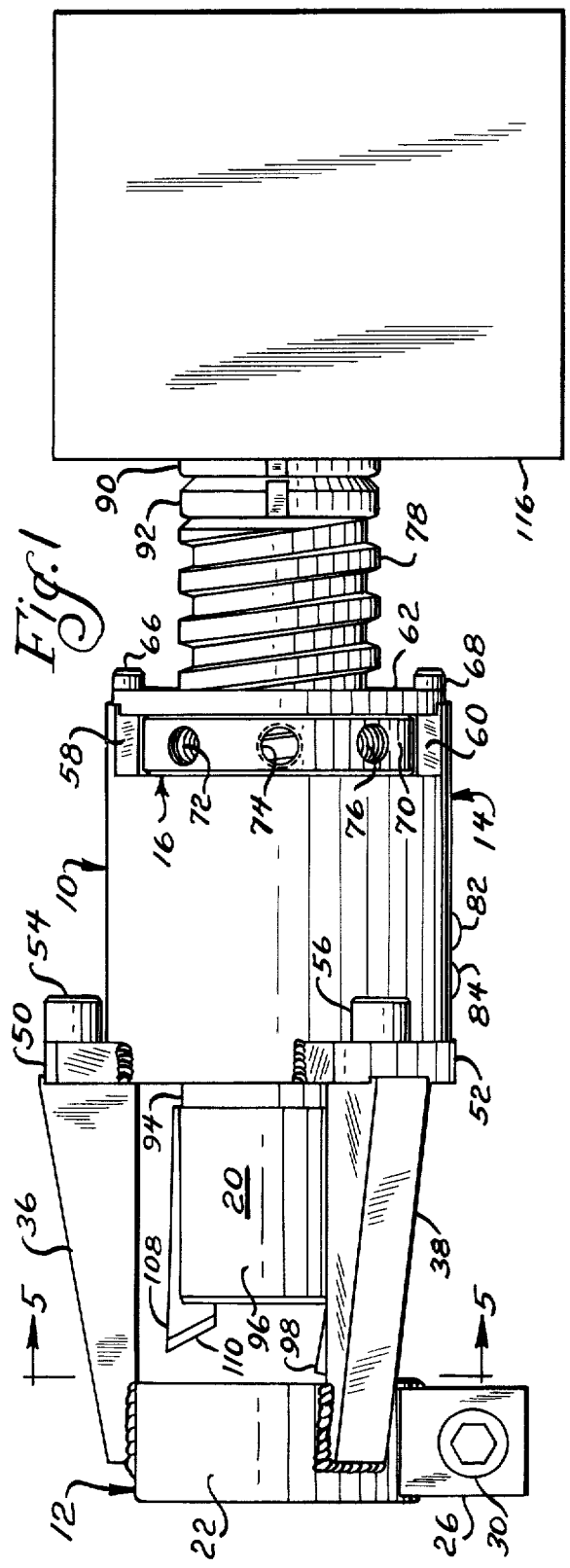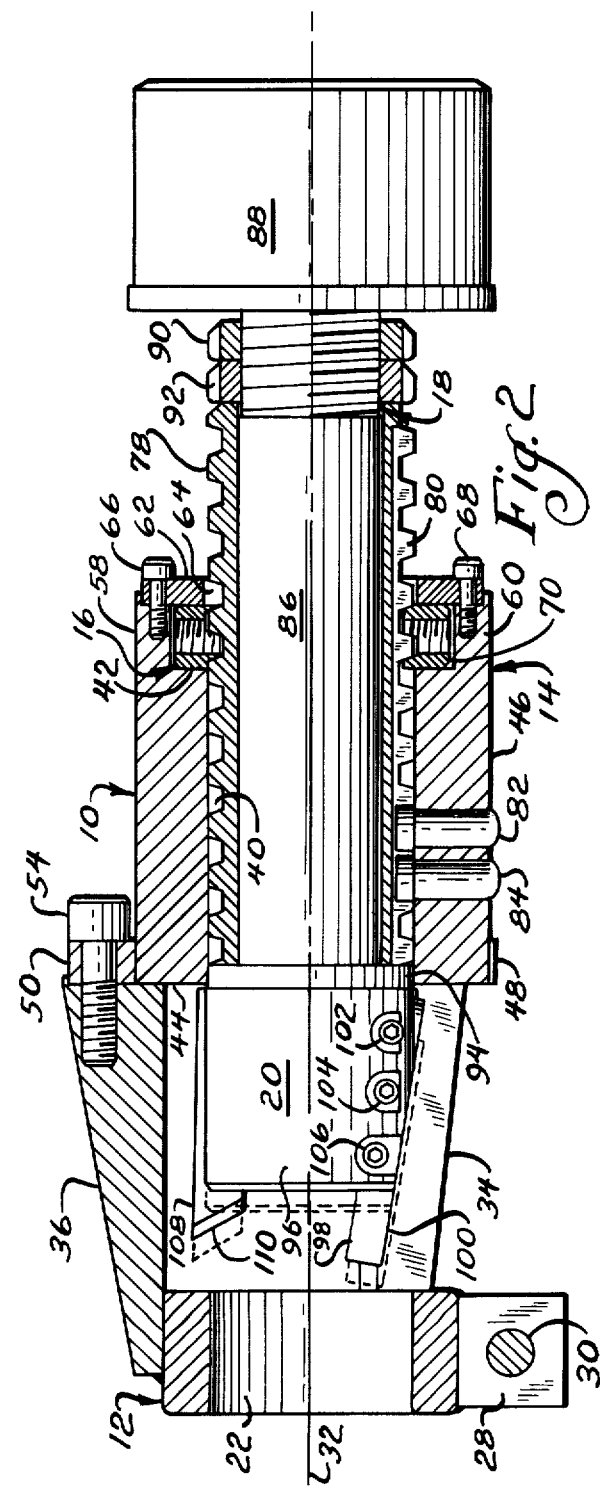

PIPE AND TUBE END PREPARATION APPARATUS

BACKGROUND OF THE INVENTION

From time to time, it is necessary to weld two pieces of tubing of the same diameter end to end. The ends of the tubing to be joined are prepared prior to welding in order to obtain a strong weld. It is good practice to prepare the tube ends by forming an inside and an outside chamfer on each tube end. The inside chamfers receive a chill ring; and the outside chamfers form a symmetric welding notch when the tube ends are abutted for welding.

In the power-generating industry, internal pressures of more than 1,000 p.s.i. are sustained by boiler tube; such pressures are accompanied by high temperatures. Welds made in boiler tube would be called upon to withstand high pressures and temperatures.

The present methods of preparing boiler tube ends for welding are inefficient. A common method of preparing boiler tube ends for welding involves forming the inside chamfer and the outside chamfer in separate operations. The inside chamfer is formed by a conical cutter. The outside chamfer is formed by a device similar to the one herein disclosed, but having a single outside chamfer cutter. The present methods of preparing boiler tube ends are time-consuming because they involve two steps. Since the chamfer-forming operations are performed independently, there is a likelihood that the inside and outside chamfers will not be concentric; and may even be skewed. If the chamfers are non-concentric, skewed or both, the weld subsequently formed may have diminished structural integrity.

SUMMARY OF THE INVENTION

The present invention relates to a pipe and tube end preparation apparatus, which has a tube holder and a housing connected to the tube holder. A head carriage mechanism is connected to the housing. The head carriage mechanism is progressively axially movable with respect to the tube holder and housing. A rotary drive train is supported by the head carriage mechanism. A cutter head assembly, having an inside chamfer cutter and an opposed outside chamfer cutter, is connected to the drive train. The outside chamfer cutter acts as a cutting guide for the inside chamfer cutter. The tube holder and housing share a common central axis. The cutter head assembly rotates about the common central axis; and also moves axially with the head carriage mechanism.

In operation, a length of tube, having a tube end to be prepared, is secured in the tube holder. Rotational motion from a suitable external source is transmitted via the drive train to the cutter head assembly. The head carriage mechanism is advanced so as to bring the cutter head assembly into cutting engagement with the tube end to be prepared. As the cutter head assembly simultaneously cuts an inside chamfer and an outside chamfer on the tube end, the head carriage mechanism progressively advances the cutter head assembly a selected amount to complete the chamfer cuts.

It is a principal object of the present invention to provide a tube end preparation apparatus having an inside chamfer cutter and an outside chamfer cutter in which the outside chamfer cutter acts as a cutting guide for the inside chamfer cutter.

It is another object of the present invention to provide a tube end preparation apparatus having a pair of opposed chamfer cutters.

It is a further object of the present invention to provide a tube end preparation apparatus which will cut a chamfer concentric with the center of a tube.

It is a still further object of the instant invention to provide a tube end preparation apparatus which is portable and convenient to use.

It is a still further object of the present invention to provide a tube end preparation apparatus which is easy to control.

It is still another object of the instant invention to provide a tube end preparation apparatus which has easily replaceable chamfer cutters.

Other objects and uses of the present invention will become readily apparent to those skilled in the art upon a perusal of the following specification in light of the accompanying drawings.

BRIEF DESCRIPTION OF THE DRAWINGS

FIG. 1 is a side elevational view of a tube end preparation apparatus, which is a specific embodiment of the present invention;

FIG. 2 is a cross-sectional view of the tube end preparation apparatus of FIG. 1;

DESCRIPTION OF THE PREFERRED EMBODIMENT

Figure 3:
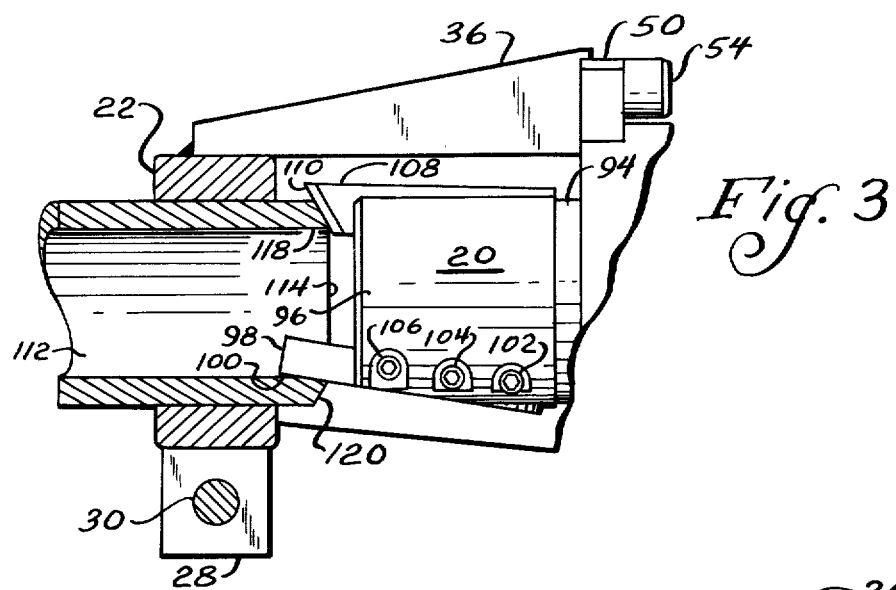
FIG. 3 is a fragmentary side elevational view, showing a portion of the present invention in cross-section, with the chamfer cutters positioned in cutting engagement with a tube end.
Figure 4:
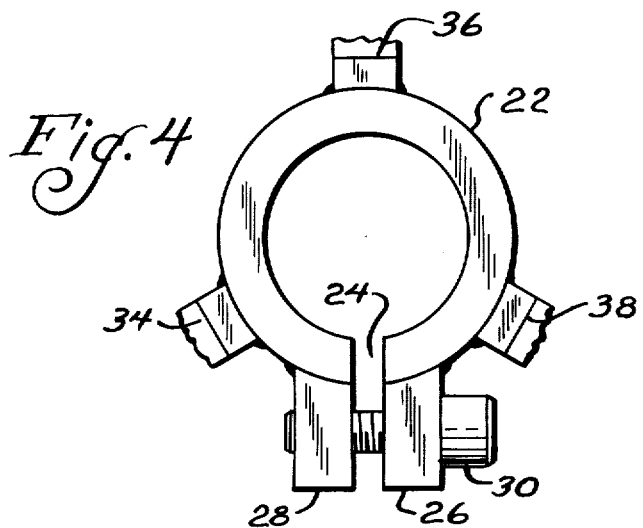
FIG. 4 is an end view of a portion of the present invention, showing a fragmentary portion of the tube holder.

Referring now to the drawings, and especially to FIGS. 1 and 2, a tube end preparation apparatus embodying the present invention is generally indicated by numeral 10. (It is to be understood that the use of the word tube herein is generic and applies to pipe as well as to tube.) Tube end preparation apparatus 10 generally includes a tube holder 12. Tube holder 12 is adapted for receipt of a circular cross-section tube. A housing 14 is connected to tube holder 12. A head carriage mechanism 16 is insertably positioned within housing 14, and is axially movable therein. A drive train 18 is rotatably supported by head carriage mechanism 16. A cutter head assembly 20 is attached to drive train 18, and is rotatable with drive train 18 with respect to tube holder 12. Drive train 18 is adapted for receiving rotational energy from an external source and transmitting the rotational energy to cutter head assembly 20. When a tube end to be prepared is secured in tube holder 12, rotating cutter head assembly 20 is advanced into cutting engagement with the tube end by head carriage mechanism 16.

Tube holder 12 includes a split clamp ring 22, having a ring gap 24. A pair of perforated clamp ears 26 and 28 are welded adjacent ring gap 24. A tightening bolt 30 passes through clamp ear 26 and is threadedly received by clamp ear 28. A central axis 32 passes through split clamp ring 22. A plurality of triangular legs 34, 36 and 38 is welded to split clamp ring 22 at equidistant points about split clamp ring 22. Split clamp ring 22 is oriented so that ring gap 24 is positioned opposite triangular leg 36. Legs 34, 36 and 38 extend from split clamp ring 22 parallel to central axis 32.

Housing 14 is of a generally cylindrical shape and has a centrally located cylindrical bore 40. Housing 14 has a top face 42, a bottom face 44 and a cylindrical outer wall 46. A plurality of perforated support ears 48, 50 and 52 is welded flush with bottom face 44 to outer wall 46 of housing 14 at equidistant points about housing 14. Legs 36 and 38 are connected, respectively, to support ears 50 and 52 by a pair of bolts 54 and 56. Leg 34 is connected to support ear 48 in a similar fashion. Housing 14 and bore 40 are also concentric about central axis 32 with split clamp ring 22.

A pair of arcuate posts 58 and 60 are formed coextensive with outer wall 46 and extend perpendicularly from top face 42 of housing 14. A circular housing cap 62, having a circular central aperture 64, is held to arcuate posts 58 and 60 by a pair of threaded fasteners 66 and 68.

Head carriage mechanism 16 includes a threaded collar 70, having a plurality of threaded radial apertures 72, 74 and 76. Threaded collar 70 is rotatably seated between housing cap 62 and top face 42. An elongated cylindrical threaded carrier sleeve 78, having a peripheral longitudinal groove 80, passes through aperture 64; threadedly engages threaded collar 70; and is transversely supported by bore 40 of housing 14. A pair of lock pins 82 and 84, mounted in housing 14, engages longitudinal groove 80 of threaded carrier sleeve 78.

Drive train 18 includes an elongated cylindrical drive shaft 86, which is rotatably supported by threaded carrier sleeve 78. A cylindrical hub 88, adapted for engagement with a source of rotational motion such as a belt drive, is connected to one end of drive shaft 86. The end of drive shaft 86, having hub 88 connected to it, is threaded to receive a pair of lock nuts 90 and 92. A sleeve cap 94 is connected to the other end of drive shaft 86. Lock nuts 90 and 92, and sleeve cap 94, are rotatable with drive shaft 86 and longitudinally support drive shaft 86 within threaded carrier sleeve 78.

Figure 5:
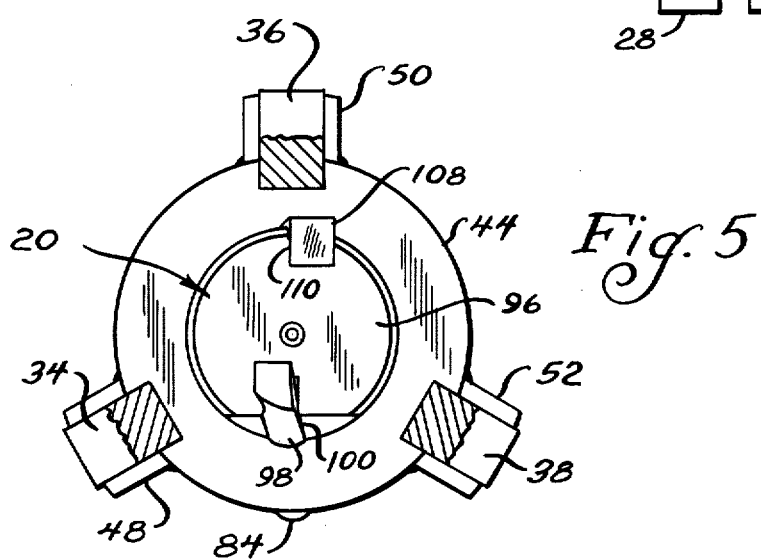
FIG. 5 is a cross-sectional view, taken on Line 5—5 of FIG. 1, showing details of the chamfer cutters.

Cutter head assembly 20 is connected to sleeve cap 94. Cutter head assembly 20 includes a cutter head 96. An inside chamfer cutter 98, having a cutting edge 100, is secured to cutter head 96 by a plurality of cap screws 102, 104 and 106. Inside chamfer cutter 98 is positioned with cutting edge 100 at, approximately, a 10° angle with central axis 32. An outside chamfer cutter 108, having a cutting edge 110, is secured to cutter head 96, opposite inside chamfer cutter 98, in a similar fashion. Outside chamfer cutter 108 is positioned with cutting edge 110, at, approximately, a 52° angle with central axis 32. Cutting edges 100 and 110 are positioned opposite one another on cutter head 96, as is shown in FIG. 5. Cutter head assembly 20 is rotatable about central axis 32.

Rotation of threaded collar 70 results in an axial or longitudinal movement of threaded carrier sleeve 78 along bore 40. Drive train 18 and cutter head assembly 20 move with threaded carrier sleeve 78. A clockwise rotation of threaded collar 70 moves inside chamfer cutter 98 and outside chamfer cutter 108 away from split clamp ring 22. A counterclockwise rotation of threaded collar 70 moves inside chamfer cutter 98 and outside chamfer cutter 108 toward split clamp ring 22. Threaded radial apertures 72, 74 and 76 of threaded collar 70 are designed for the receipt of an appropriate moment arm to reduce the amount of effort required to produce a torque on threaded collar 70. Threaded carrier sleeve 78 is prevented from rotating by lock pins 82 and 84, which engage groove 80.

Referring now to FIG. 3, a piece of boiler tube 112, having an end 114 which is to be prepared for welding, is inserted into split clamp ring 22. Tightening bolt 30 is turned clockwise, drawing clamp ears 26 and 28 together, thereby narrowing ring gap 24 and securely centering boiler tube end 114 beneath cutter head assembly 20. A source of rotational motion 116, such as a belt drive, is connected to hub 88, thereby effecting rotation of drive train 18 and cutter head assembly 20.

Threaded collar 70 is rotated counterclockwise, thus bringing rotating chamfer cutters 98 and 108 (and their respective cutting edges 100 and 110) into cutting engagement with boiler tube end 114. Inside chamfer cutter 98 begins cutting an inside chamfer 118 on tube end 114; and outside chamfer cutter 108 begins cutting an outside chamfer 120 on tube end 114. Threaded collar 70 is again rotated clockwise so as to progressively advance chamfer cutters 98 and 108 to complete the formation of inside chamfer 118 and outside chamfer 120. Upon completion, threaded collar 70 is rotated counterclockwise to move cutter head assembly 20 out of contact with boiler tube end 114. Rotating drive train 18 and cutter head assembly 20 are stopped; and boiler tube 112 is removed from split clamp ring 22.

Since boiler tube 112 is held centered with, and perpendicular to, central axis 32, inside chamfer 118 and outside chamfer 120 are simultaneously formed concentric with tube end 114 and are not skewed.

It may be appreciated that cutting edge 110 operates at a markedly steeper cutting angle than cutting edge 100 and contacts a larger area of tube end 114 than does cutting edge 100. The larger contact area traversed by cutting edge 110 provides more support for cutting edge 110 than the correspondingly smaller contact area provides for cutting edge 100. Since cutting edge 110 has a greater degree of support than cutting edge 100, cutting edge 110 is less likely to gouge tube end 114 than cutting edge 100. Hence, cutting edge 110 provides positive control over cutter head assembly 20 and cutting edge 100 does not have an opportunity to gouge the smaller area which it engages.

As tube end preparation apparatus 10 is used, cutting edges 100 and 110 are worn down. Inside chamfer cutter 98 may be easily removed from cutter head 96 for repair or replacement by backing off cap screws 102, 104 and 106; removing inside chamfer cutter 98; inserting a new inside chamfer cutter; and tightening cap screws 102, 104 and 106. Outside chamfer cutter 108 can be easily replaced in a similar fashion.

It may be appreciated that cutting uniform concentric inside and outside chamfers simultaneously on a tube end is a simple process with the present invention. One need only secure a tube end to be prepared in split clamp ring 22, supply rotational motion to hub 88 and progressively advance cutter head assembly 20 into cutting engagement with the tube end to be prepared to form such chamfers.

It may also be appreciated that the present invention is particularly adapted for in situ tube end preparation since it is portable; and, as mentioned above, easy to set up and use.

Although a specific embodiment of the herein-disclosed invention has been described in detail above, it may be appreciated that those skilled in the art may make various modifications and changes in the specific tube end preparation apparatus herein disclosed without departing from the spirit and scope of the present invention. It is to be expressly understood that the instant invention is limited only by the appended claims.

What is claimed is:

1. A portable tube end preparation apparatus for preparing a tube end for welding comprising: a tube holder adapted for being fixedly mounted on the tube end to be prepared; a housing connected to said tube holder; said tube holder and said housing having a common central axis; a head carriage mechanism connected to said housing, said head carriage mechanism being movable with respect to said housing parallel to said central axis; a drive train rotatably supported by the head carriage mechanism and movable therewith, said drive train being rotatable about the central axis; and a cutter head assembly connected to said drive train for rotation about the central axis by said drive train, said cutter head assembly having a pair of diametrically opposed chamfer cutters, one chamfer cutter of said pair being adapted for forming an inside chamfer on the tube end, and the other chamfer cutter of said pair being adapted for forming an outside chamfer on the tube end.

2. A portable tube end preparation apparatus as defined in claim 1 in which; the inside chamfer cutter has an inside chamfer cutting edge disposed at a shallow angle with the central axis; and the outside chamfer cutter has an outside chamfer cutting edge disposed with said central axis at a substantially greater angle than said inside chamfer cutter, said outside chamfer cutter acting as a cutting guide for said inside chamfer cutter.

3. A portable tube end preparation apparatus as defined in claim 2 in which the outside chamfer cutting edge is disposed with the central axis at approximately five times the angle of said inside chamfer cutting edge.

4. A portable tube end preparation apparatus for preparing a tube end for welding comprising: a split clamp ring adapted for connection with the tube end to be prepared; a first leg, a second leg and a third leg connected to said split clamp ring at equidistant points about said split clamp ring; a cylindrical housing having a centrally located bore, said cylindrical housing being connected to said first leg, second leg and third leg at equidistant points about said cylindrical housing; a threaded carrier sleeve positioned within said bore, said threaded carrier sleeve being capable of longitudinal motion through said bore; a threaded collar threadedly engaging said threaded carrier sleeve, said threaded collar being mounted in engagement with said housing, said threaded collar also being adapted to move said threaded carrier sleeve longitudinally within said bore when said threaded collar is rotated; an elongated drive shaft rotatably supported by and longitudinally movable with said threaded carrier sleeve; a hub connected to one end of said elongated drive shaft for rotatable engagement with an external power source; a cutter head connected to the other end of said elongated drive shaft, said cutter head being rotatable with said hub and longitudinally movable with said threaded carrier sleeve; an inside chamfer cutter removably connected to the cutter head, said inside chamfer cutter being adapted to form an inside chamfer on the tube end to be prepared; and an outside chamfer cutter positioned diametrically opposite said inside chamfer cutter and removably connected to the cutter head, said outside chamfer cutter being adapted to form an outside chamfer on the tube end to be prepared.

5. A portable tube end preparation apparatus for preparing a tube end for welding as defined in claim 4, in which the split clamp ring, the cylindrical housing, the threaded carrier sleeve, the hub, the drive shaft and the cutter head are concentric about a common central axis.

6. A portable tube end preparation apparatus as defined in claim 5 in which; the inside chamfer cutter has an inside chamfer cutting edge disposed at a shallow angle with the central axis; and the outside chamfer cutter has an outside chamfer cutting edge disposed with said central axis at a substantially greater angle than said inside chamfer cutter, said outside chamfer cutter acting as a cutting guide for said inside chamfer cutter.

7. A portable tube end preparation apparatus as defined in claim 6 in which the outside chamfer cutting edge is disposed with the central axis at approximately five times the angle of said inside chamfer cutting edge.

* * * * *